(12) United States Patent
Van De Kerkhof et al.

(10) Patent No.: US 7,107,111 B2
(45) Date of Patent: Sep. 12, 2006

(54) TRICK PLAY FOR MP3

(75) Inventors: Leon Maria Van De Kerkhof, Eindhoven (NL); Arnoldus Werner Johannes Oomen, Eindhoven (NL); Ilija Pjanovic, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 794 days.

(21) Appl. No.: 10/124,009

(22) Filed: Apr. 17, 2002

(65) Prior Publication Data

US 2003/0009246 A1   Jan. 9, 2003

(30) Foreign Application Priority Data

Apr. 20, 2001 (EP) .................................. 01201439
Feb. 8, 2002 (EP) .................................. 02075518

(51) Int. Cl.
*G06F 17/00* (2006.01)
*G10L 21/00* (2006.01)
*G10L 21/04* (2006.01)

(52) U.S. Cl. ........................................ 700/94; 704/503

(58) Field of Classification Search .................. 700/94; 381/104; 386/96; 341/60, 61, 95; 84/603, 84/605; 704/500, 503, 504

See application file for complete search history.

(56) References Cited

U.S. PATENT DOCUMENTS

| | | | | |
|---|---|---|---|---|
| 5,502,571 A | * | 3/1996 | Decotignie et al. | 386/112 |
| 5,642,338 A | * | 6/1997 | Fukushima et al. | 386/96 |
| 5,724,391 A | * | 3/1998 | Takeuchi et al. | 375/240 |
| 6,466,476 B1 | * | 10/2002 | Wong et al. | 365/185.03 |
| 6,721,710 B1 | * | 4/2004 | Lueck et al. | 704/500 |

* cited by examiner

*Primary Examiner*—Sinh Tran
*Assistant Examiner*—Andrew Flanders

(57) ABSTRACT

Trick play and/or editing is applied to an original data stream, for example an MP3 data stream which includes headers and signal data interspersed with each other. Each header specifies a distance to a subsequent header, each header corresponding to a frame of signal data, the header being associated with a pointer that points a starting point of the signal data for that frame relative to the header. Before applying trick play, the original data stream is converted into an intermediate data stream of the same type as the original stream. During conversion, the starting points of the frames are moved to predetermined positions relative the associate headers and the headers are modified to create additional space between the headers so that the frames fit between headers.

17 Claims, 2 Drawing Sheets

TRICK PLAY FOR MP3

FIELD OF THE INVENTION

The invention relates to facilities for trick play (fast forward etc.) and/or editing of compressed information, in particular compressed audio information.

BACKGROUND ART

The MPEG-1 and MPEG-2 Layer III (MP3) formats (ISO/IEC 11172-3 and ISO/IEC 13818-3) are used extensively for representing compressed audio information. Compression reduces the bit rate of the audio information: the number of bits needed to represent a time interval of the audio information. In general, the MP3 format supports various reduction rates, depending on the required bit rate.

The MP3 audio information is transported in a data stream that contains headers at specific intervals. Each header is associated with a frame describing a predetermined number of samples of audio data in compressed form. The header indicates information about the data in the frame, such as the sample frequency of the data in the frame and the bit rate.

The interval between successive headers is a predetermined function of information in the header. MP3 compatible decoders are enabled to find each header using the header-distance determined from the preceding header.

However, the actual number of bits needed to represent a frame can deviate from the space available in the interval between the headers. This is because with MP3 the amount of information that is needed to encode audio information can vary from frame to frame.

To cope with these deviations MP3 allows frames to start at a variable offset relative to the headers. Thus, space left over between headers by preceding frames can be used for data of the subsequent frame. MP3 provides for a pointer associated with each header. The pointer indicates the start of data of the frame associated with the header relative to the position of the header. As a result a frame of data can start at a variable position preceding the associated header in space left over by a preceding frame. Exceptionally, the pointer can be zero, so that the data starts immediately after the frame. Thus, the position of the start of the data relative to the position of the header depends on the audio content encoded by the data stream.

To decode these frames MP3 decoders store as a minimum a predetermined amount of data preceding the header (512 bytes, excluding headers and side information of previous frames) in a buffer memory to allow the decoder to access the frame data once the pointer has been received.

It has been found that the presence of frame data outside the area between the corresponding frame header and the subsequent header impedes efficient implementation of functions like trick play (fast forward play etc.) and/or editing in MP3. For a fast forward function for example, one would like to skip frames so that only data from between selected pairs of headers is stored. However, this is insufficient for decoding because the pointers of the selected headers might point back to data that has not been stored. Similarly, to insert data during editing, one cannot simply start from an arbitrary header without having to load data preceding that header.

As a result, relatively complicated decoders are needed to support trick play and/or editing. In the extreme, it may be necessary to decompress the data perform these functions and compress the data again, which is very inefficient in terms of complexity and quality.

SUMMARY OF THE INVENTION

Amongst others, it is an object of the invention to provide for trick play and/or editing with simple measures.

The invention provides for a signal processing apparatus for processing data streams of a stream type that comprises headers and signal data interspersed with each other, each header specifying a distance to a subsequent header, each header corresponding to a frame of signal data, the header being associated with a pointer that points to a starting point of the signal data for that frame relative to the header, the apparatus comprising an input for receiving an original data stream of said stream type;

a trick play and/or editing unit for processing an intermediate data stream of said stream type;

a stream converter between the input and the trick play and/or editing unit, the stream converter converting the original data stream into the intermediate data stream, the stream converter moving the starting points of the frames to predetermined positions relative the associate headers and modifying the headers to create additional space between the headers so that the frames fit between headers.

Thus, an intermediate data stream is created that can be decompressed with a standard decoder (an MP3 decoder in case of an MP3 stream) and that can be manipulated for trick play and/or editing without requiring data for a frame from a position that depends on other frames. Preferably, the data directly follows the header. Thus no data preceding the header needs to be stored to apply trick play to the frame.

In an embodiment, the headers are modified by changing the bit rate specified in the header, without changing the actual bit rate of the frame data. In an MP3 stream such a modification creates the required space between headers with a minimum of processing complexity. In a first embodiment the bit rate in the headers for all frames is set to a maximum possible bit rate (320 kbit/sec for MP3). This requires a minimum of processing complexity. In a second embodiment the bit rate in the header is made dependent on the amount of signal data in the frame and to the minimum possible value that can be set in the header and that is sufficient to create enough space to store the frame data between headers.

These and other advantageous aspects of the apparatus and method according to embodiments of the invention will be described in more detail using the following figures, of which FIG. 1 shows an MP3 decoding system;

Figure 1:
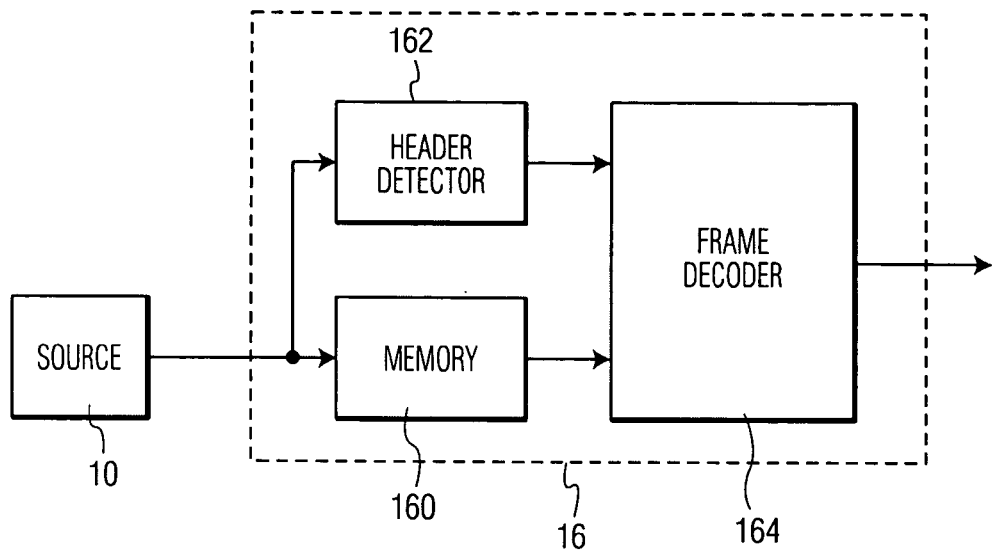

FIG. 1 shows a prior art MP3 decoding system. The invention will be described using MPEG-1 Layer III as an example. However, the same principles apply to MPEG-2 Layer III, only some constants have different values. The system contains an MP3 source 10 that feeds a stream decoder 16. The MP3 source 10 contains for example a storage medium (not shown) for stored MP3 data and a read-out unit (not shown) for reading that data from the storage unit, in another example, the MP3 source 10 contains an interface to a communication channel (e.g. the Internet or a radio broadcast) and an output for outputting a received MP3 stream.

The stream decoder 16 contains a buffer memory 160 with an input coupled to the MP3 source 10, a header detector 162 and a frame decoder 164. The header detector has an input coupled to the buffer memory 160. The frame decoder 164 has inputs coupled to the header detector 162 and the buffer memory 160 and an output for decoded audio.

Figure 2:
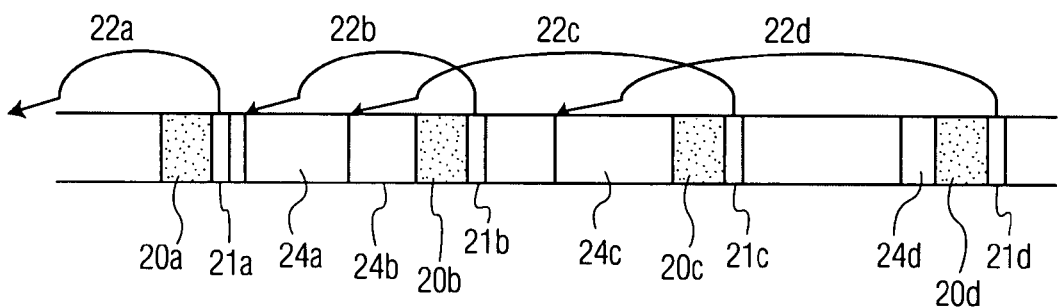
FIG. 2 shows an MP3 data stream.

FIG. 2 shows an example of a stream of MP3 data. The stream contains a number of headers 20a–d, followed by backpointers 21a–d that point to the starting points 22a–c of frames. The backpointers 21a–d are illustrated by means of arrows 22a–d pointing back from the locations in the stream where the backpointers 22a–d are stored to the starting points 22a–c to which the backpointers 21a–d point.

Each header 20a–d corresponds to a frame of compressed audio data. A backpointer 21a–d following the header 20a–d indicates the starting point 22a–d of data in the frame. The backpointer 21a–d may be zero, in which case the starting point 22a–c follows directly after the backpointer 21a–d.

The format of an MP3 header is described in table I.

TABLE I format of MP3 header

| Field | Number of bits |
|---|---|
| syncword | 12 |
| ID | 1 |
| layer | 2 |
| protection bit | 1 |
| bitrate index | 4 |
| sampling frequency | 2 |
| padding bit | 1 |
| private bit | 1 |
| mode | 2 |
| mode extension | 2 |
| copyright | 1 |
| original/copy | 1 |
| emphasis | 2 |

The "syncword" is a specific bit pattern that facilitates the identification of headers 20a–d in the stream. The ID, layer, private bit, mode, mode expansion, copyright, original/copy and emphasis fields are specific to MP3 and do not concern the invention. The protection bit signals whether the header is followed by a 16 bit CRC word (Cyclic Redundancy Check; determined using a CRC 16 polynomial). After the optional CRC word follows the backpointer 21a–d (also called "main_data_begin"), which is a nine bit number, which indicates how many (8-bit) bytes the starting byte of the frame 24a–c is back from the position of the backpointer 21a–d (not counting header bytes, CRC words and side-information).

The bitrate index field of the header contains a pointer to an entry in a table of possible bitrates. Available bit rates and corresponding bit rate indices are shown in table Ia TABLE Ia bit rate index values and corresponding bit rates

| bit_rate_index | bitrate (kbit/s) |
|---|---|
| '0000' | free |
| '0001' | 32 |
| '0010' | 40 |
| '0011' | 48 |
| '0100' | 56 |

TABLE Ia-continued bit rate index values and corresponding bit rates

| bit_rate_index | bitrate (kbit/s) |
|---|---|
| '0101' | 64 |
| '0110' | 80 |
| '0111' | 96 |
| '1000' | 112 |
| '1001' | 128 |
| '1010' | 160 |
| '1011' | 192 |
| '1100' | 224 |
| '1101' | 256 |
| '1110' | 320 |
| '1111' | forbidden |

The sampling frequency field indicates the sampling frequency used for the data. Available sampling frequencies are shown in table Ib TABLE Ib Sampling frequency code and corresponding sampling frequencies

| sampling_frequency | frequency specified (kHz) |
|---|---|
| '00' | 44.1 |
| '01' | 48 |
| '10' | 32 |
| '11' | reserved |

Together the bit rate, sampling frequency and padding bit determine the distance N from the start of the header to the start of a subsequent header. In principle, a fixed number of 1152 PCM samples is coded per frame. The sampling frequency determines the duration of the time interval that is coded by this number of samples. From the bit rate it follows how many bits are needed, on average, to encode a time interval with such a duration. This is the average number of bits per frame. The distance between headers corresponds to this number of bits, rounded upward to provide an integer number of bytes (units of 8 bits). That is, the distance in bytes (units of 8 bits) is determined from the value of R, where $$R=144*bit\_rate/sampling\_frequency.$$

(the number 144 results from the 1152 PCM samples per frame divided by the number 8, the number of bits per byte). If R is an integer the distance between headers is R. If R is not an integer, the distance between some pairs of headers is N (the next lower integer below R) and N+1 between other pairs of headers. The padding bit indicates which of these two distances is used.

In operation, MP3 source 10 produces an MP3 stream as illustrated in FIG. 2. Information from this stream is stored in buffer memory 160 of stream decoder 16. Header detector 162 initially locates a header at the start of the stream or by detecting the syncword of a header. Subsequently, header detector 162 each time uses a current header to compute the distance to a subsequent header in the stream from the bitrate index field, the sampling frequency field of the header and the padding bit. From this distance header detector 162 computes the address of the location in buffer memory 160 where the next header is stored and reads the next header and so on. The header detector 162 checks whether a valid syncword is stored at the computed location. If not, an error has occurred and the header detector has to process an error condition to locate the header before decoding can proceed.

Header detector 162 sends the address of the location where the header is stored to frame decoder 164. Frame decoder 164 uses this address to determine the address where the backpointer associated with the header is stored, retrieves the backpointer and uses the backpointer to compute the address where the starting point of the frame associated with the header is stored. Frame decoder 164 uses this address to retrieve data from the frame, from which it decodes the audio signal.

Figure 3:
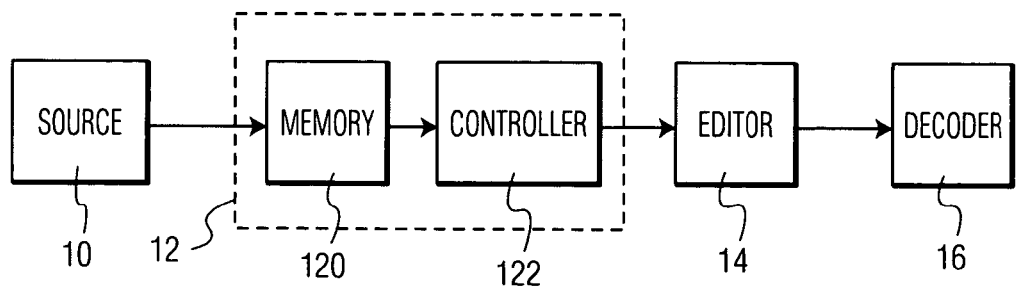
FIG. 3 shows an MP3 decoding system with trick play facility.

FIG. 3 shows an MP3 audio decoding system according to an embodiment of the invention. In addition to the MP3 source 10 and the MP3 stream decoder 16, this system contains a converter 12 and a trick play and/or edit unit 14 inserted, in cascade, between the source 10 and the decoder 16.

In operation the trick play and/or edit unit 14 receives an intermediate MP3 stream from converter 12 and forms a "tricked" MP3 stream for decoding by the MP3 stream decoder 16. The trick play and/or edit unit 14 accesses selected frames in the intermediate stream, to use the content of these selected frames for the formation of frames the tricked MP3 stream. An example of trick play is skipping of selected frames from the intermediate stream so as to obtain a fast forward mode with audio monitor function. Another example could be accessing some frames repeatedly, each time to form another successive frame of the tricked stream so as to provide a slow forward mode.

The converter 12 transforms an original MP3 stream from MP3 source 10 into the intermediate MP3 stream. The converter 12 does this in a way so that the trick play and/or edit unit 14 needs to access only a predetermined limited part of the intermediate stream relative to the header for a selected frame in order to access the frame. Preferably, only the part of the stream following the header for the selected frame needs to be accessed.

The converter 12 contains a buffer memory 120 and a microcontroller 122. The microcontroller 122 has an input coupled to the buffer memory 120 and an output coupled to the trick play unit 14. An output of the trick play unit is coupled to the input of the stream decoder 16.

In operation, converter 12 converts the MP3 data stream into an intermediate MP3 data stream in which the distance between successive headers has been increased and the frame data has been moved so that the backpointers are zero. Data arriving from stream source 10 is written in locations of buffer memory 120 and microcontroller 122 generates the intermediate stream using newly generated header information and information copied from buffer memory 120.

Figure 4:
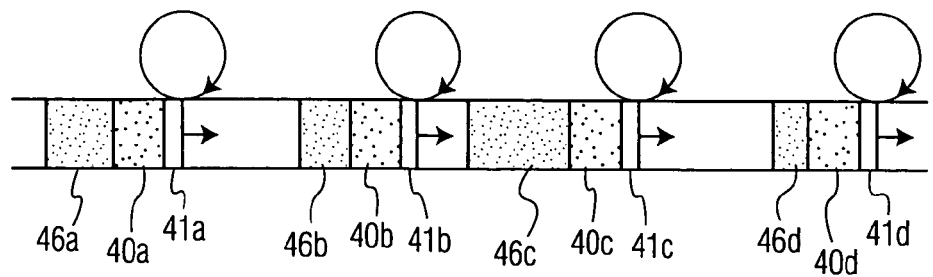
FIG. 4 shows a further MP3 data stream.

FIG. 4 shows an MP3 data stream output by the converter 12. This stream contains headers 40a–d, followed by backpointers 41a–d pointing at starting points of frames that all follow directly after the associated backpointer 41a–d. The signal data of the frame is followed by stuffing 46a–d. Table II shows pseudo code that describes the operation of a program for microcontroller 122 in converter 12 for generating the stream of FIG. 4. This code is shown for the purpose of illustration only: in practice any actual code may differ in many details.

TABLE II

| pseudo code of operation of converter 12 | |
|---|---|
| 1 | WriteNewHeader(HIn) |
| 2 | WriteBackPointer(0) |
| 3 | F=Hin–Buffer[Hin+Offset] |
| 4 | N=CopyFrame(F) |
| 5 | Stuff(NewDistance–N) |
| 6 | Hin=FindHeader(Hin) |
| 7 | Repeat from 1 |

TABLE II-continued

In table II, the pointer Hin points to a location in buffer memory 120 where the current header in the original stream from MP3 source 10 is stored. The pointer F points to the location in buffer memory 122 where the first bit of the frame associated with the current header is stored. F is determined by subtracting the content of buffer memory 120 at a location following the location pointed at by Hin after an offset given by the value of Offset (in practice F will be corrected for space taken up by the headers). N is the number of bits in the frame.

In a first step of the pseudo program, a new header is written to the intermediate stream in the first step (1). In the new header the bitrate index field has been modified with respect to the headers of the original stream. Preferably, the bitrate is set to the maximum possible value of 320 Kilobit per second. The padding bit in the headers of the intermediate stream may be set as required for the data, or some pattern of setting and clearing the padding bit in successive headers may be used. Other fields than the bitrate and the padding bit may be copied substantially from the header from the original stream into the header in the intermediate stream.

Following the header, a backpointer value of zero is written to the intermediate stream in step 2.

In a third step (3) the location F in buffer memory 120 of the start frame data in the original stream is determined from the 9-bit backpointer value located at an Offset from the current header in the data stored from the original stream. In a fourth step (3) the frame data is copied into the intermediate stream. The fourth step returns the amount N of data copied. In a fifth step stuffing information is output to the intermediate stream. The amount of stuffing makes up for the difference between the new distance between frames, which follows from the parameters set in the new header, and the amount N of frame data that has been copied.

In a sixth step (6) the address is computed of the location in buffer memory 120 where the next header from the original stream is stored. This address follows from the content of the current header (pointed at by HIn). The value of the pointer HIn is updated to the newly computed location. Subsequently, the pseudo-code is repeated from the first step.

Thus, an intermediate stream is formed in which frame data always follows the header that corresponds to that data. It will be appreciated that, without deviating from the invention, the actual implementation may differ from that of table II in many details. For example, the bit rate in the headers of the intermediate stream may be set to the minimum possible bit rate value (from table Ia) that results in an interval between successive headers that is sufficiently large to contain the frame data (instead of to the maximum possible bit rate value). This saves space for storing or transmitting the intermediate bit stream.

In another example separate areas of memory may be reserved for headers and frame data, the computed value of the position of the next header in the stream being used to ensure that the header is not stored in the area for frame data. The use of the buffer memory may be circulating, locations from a starting point in memory 120 being reused once data from the original stream has been written into a predetermined number of locations.

Preferably microcontroller 122 sets the protection bit in the newly generated header for the intermediate stream so that no CRC check will be performed downstream from the converter 12. However, if desired, the protection bit may be set to allow a CRC check. In this case, microcontroller 122 computes a new CRC value from the data in the intermediate stream and puts this new CRC value into the intermediate stream.

Figure 5:
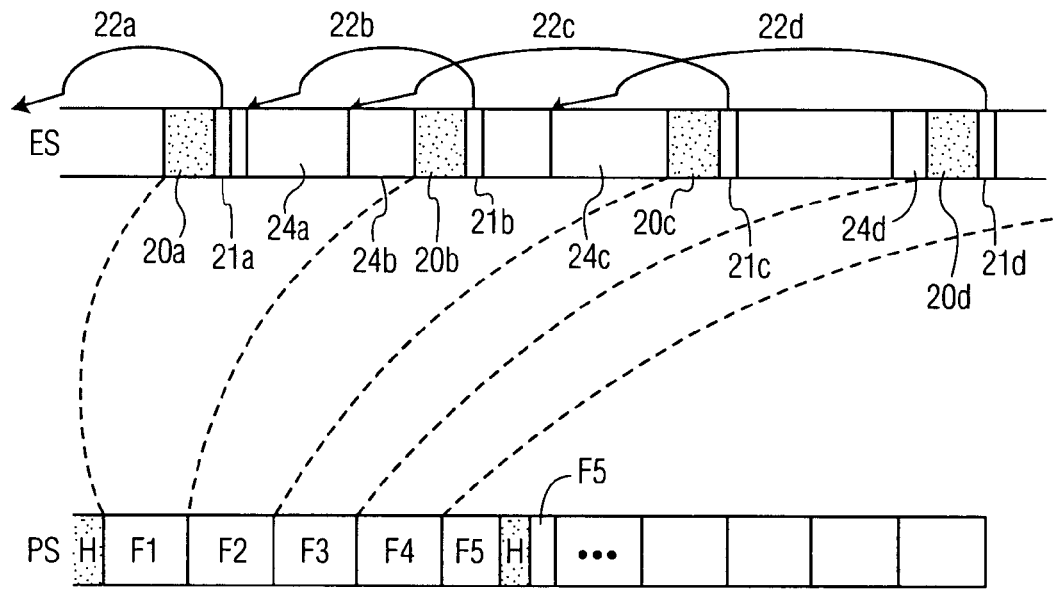
FIG. 5 shows incorporation of MP3 frames in a program stream.

In practical applications, data frames of the MP3 data stream may be incorporated in a program stream or transport stream. FIG. 5 shows an example of incorporating data frames of an MP3 data stream (also called MP3 elementary stream) ES into a program stream PS. The MP3 elementary stream ES corresponds to the data stream shown in FIG. 2. Apart from the audio data frames, the program stream PS may also include still images, video, text lyrics or other additional information. For the sake of clarity, the program stream PS in FIG. 5 only includes frames of the MP3 elementary stream ES. The basis unit of a program stream is a sector of e.g. 2 kBytes. A first sector in the program stream PS includes a sector header H of e.g. 32 bytes and a payload of e.g. 2016 bytes. The payload includes a number of data frames F1 ... F5 of the MP3 elementary stream ES. An MP3 frame (at 128 kbps) is 417 or 418 bytes long. That means that the payload may include 2016/418=4.82 frames. Therefore, part of frame F5 is included in the next sector. For other bit-rates the number of frames in sector may be different.

Each sector header H may include information about the type of sector (audio, still images, video or text lyrics). In the case the program stream sector includes MP3 audio information, the sector header H includes a time stamp of the first MP3 frame incorporated in the sector.

Figure 6:
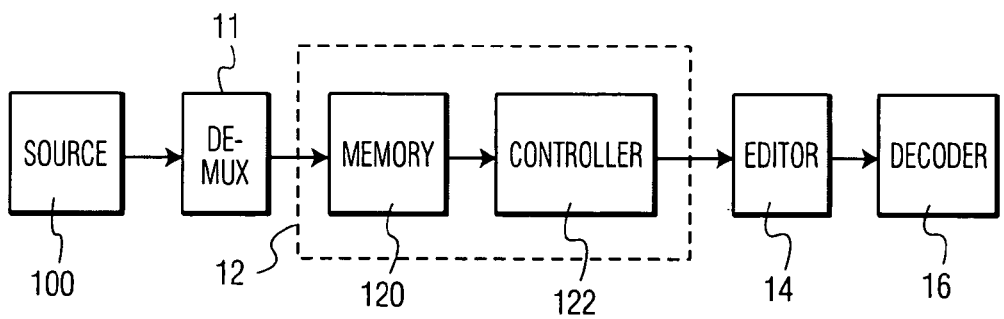
FIG. 6 shows a further MP3 decoding system with trick play facility.

FIG. 6 shows an MP3 decoding system with trick play facility which is suitable for handling program streams. The decoding system comprises a program stream source 100 that feeds a demultiplexer 11. The demultiplexer is arranged to read the audio information from the program stream PS, the structure of the program stream PS being known at the demultiplexer. The demultiplexer 11 is further arranged to search for MP3 time stamps inside a program stream. The demultiplexer can jump on sector boundaries.

In normal play, the MP3 stream obtained in the demultiplexer and furnished to the decoder is converted in converter 12 as explained above. When a trick play (e.g. Fast Forward or Fast Reverse) command is given, the current frame should preferably be finished, i.e. all the data should be read from the buffer 120. After that, the demultiplexer 11 is used to jump to a sector in the program stream PS which is M milli-seconds forward or backward. For this jump use can be made of the time stamps in the sector header. From that position one more sector back in time is read to be able to find the main data for the first MP3 frame in the case this data is not present in the current sector. Thereafter the first frame header in the sector is searched for and the associated frame is converted in converter 12 to a frame in the intermediate stream. A number of N frames (including the first frame) is decoded and played back. Preferably all these frames are converted into the intermediate stream. The fast (forward or reverse) playing speed is approximately M/(N*frame length in milli-seconds) times faster than during normal playing. For an encoder setting using a sampling frequency of 44.1 kHz, the frame length is 26.12 ms.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A signal processing apparatus for processing data streams that comprises headers and signal data interspersed with each other, each header specifying a distance to a subsequent header, each header corresponding to a frame of signal data, the header being associated with a pointer that points to a starting point of the signal data for that frame relative to the header, the apparatus comprising an input for receiving an original data stream;

a stream converter following the input, the stream converter converting the original data stream into an intermediate data stream, the stream converter moving the starting points of the frames to predetermined positions and modifying the headers to create additional space between the headers so that the frames fit between headers;

wherein the stream converter is arranged to modify the headers by adjusting a bit rate specified in the headers of the intermediate stream without modifying an actual bit rate of the signal data.

2. The signal processing apparatus according to claim 1, comprising a trick play and/or editing unit coupled to an output of the stream converter for processing the intermediate data stream.

3. The signal processing apparatus according to claim 1, wherein said predetermined position follows the header so that no data associated with a preceding frame occurs between the header arid said predetermined position in the intermediate stream.

4. The signal processing apparatus according to claim 1, wherein the stream converter is arranged to modify the bit rate specified in the headers of the intermediate stream to a maximum settable bit rate value.

5. The signal processing apparatus according to claim 1, wherein the stream converter is arranged to modify the bit rate specified in the headers of the intermediate stream to signal data dependent bit rates, the respective bit rate of a respective header being modified to a minimum settable value that is higher than the actual bit rate of the frame associated with that header.

6. The signal processing apparatus according to claim 1 wherein said original data stream is an MP3 type of data stream.

7. The signal processing apparatus according to claim 1, wherein the data streams have been incorporated in program streams, a given program stream comprising several sectors, each sector comprising a sector header and a plurality of the data frames, wherein the apparatus further comprises means for jumping to a position several sectors forwards or backwards in the given program stream; reading the data frames from a current sector associated with that position; and furnishing the data frames of the current sector to the stream converter.

8. The signal processing apparatus according to claim 7, wherein from the position several sectors forwards or backwards one more sector back in time is read to be able to find the main data for the first data frame of the current sector in the case this data is not present in the current sector.

9. A method of applying trick play and/or editing to signal data from an original data stream that comprises headers and signal data interspersed with each other, each header specifying a distance to a subsequent header, each header corresponding to a frame of signal data, the header being associated with a pointer that points to a starting point of the signal data for that frame relative to the header, the method comprising the acts of:

converting the original data stream into an intermediate data stream, said converting comprising moving the starting points of the frames to predetermined positions and modifying the headers to create additional space between the headers so that the frames fit between headers; and applying trick play and/or editing to the intermediate data stream;

wherein the headers are modified by adjusting a bit rate specified in the headers of the intermediate stream without modifying an actual bit rate of the signal data.

10. The method according to claim 9, the bit rate specified in the headers of the intermediate stream is modified to a maximum settable bit rate value.

11. The method according to claim 10, the bit rate specified in the headers of the intermediate stream is modified to signal data dependent bit rates, the respective bit rate of a respective header being modified to a minimum settable value that is higher than the actual bit rate of the frame associated with that header.

12. The method according to claim 9 wherein said original data stream is an MP3 type of data stream.

13. The method according to claim 9, wherein the data streams have been incorporated in program streams, a given program stream comprising several sectors, each sector comprising a sector header and a plurality of the data frames, the method further comprising the acts of:

jumping to a position several sectors forwards or backwards in the given program stream;

reading the data frames from a current sector associated with that position; and converting the data frames in the sector to the intermediate stream.

14. The method according to claim 13, wherein from the position several sectors forwards or backwards one more sector back in time is read to be able to find the main data for the first data frame of the current frame in the case this data is not present in the current sector.

15. An apparatus comprising:

an input for receiving a data stream;

a converter configured to move starting points of frames of said data stream to predetermined positions and to modify headers of said frames to create additional space between the headers so that the frames fit between the headers;

wherein said converter is further configured to modify the headers by adjusting a bit rate specified in the headers without modifying an actual bit rate of data included in said frames.

16. The apparatus of claim 15, wherein said predetermined position follows a header of the headers so that no data associated with a preceding frame occurs between the header and said predetermined position.

17. The apparatus of claim 15, wherein said data stream is an MP3 type of data stream.

* * * * *